United States Patent [19]

Clarke

[11] Patent Number: 4,699,477

[45] Date of Patent: Oct. 13, 1987

[54] PROJECTION LENS SYSTEM

[75] Inventor: John A. Clarke, Carshalton, England

[73] Assignee: U.S. Philips Corporation, New York, N.Y.

[21] Appl. No.: 807,385

[22] Filed: Dec. 10, 1985

[30] Foreign Application Priority Data

Dec. 14, 1984 [GB] United Kingdom ............... 8431615

[51] Int. Cl.$^4$ ..................... G02B 13/18; G02B 9/34
[52] U.S. Cl. .................... 350/432; 350/412; 350/474
[58] Field of Search ............ 350/432, 412, 474

[56] References Cited

U.S. PATENT DOCUMENTS 4,595,263 6/1986 Clarke ..................... 350/432

Primary Examiner—John K. Corbin
Assistant Examiner—Rebecca D. Gass
Attorney, Agent, or Firm—F. Brice Faller

[57] ABSTRACT

A lens system is provided which is suitable for back-projecting an enlarged image of a TV cathode ray tube (CRT). To achieve a compact cabinet design 1 for such a projection television set, a short projection throw and a wide projection angle are required, together with a wide aperture (F/1) for a bright projected picture and with a definition which may need to be good enough to resolve 1249 line television pictures. The lens system comprises a concave CRT face plate FP and three lens elements L1, L2, L3. L2 and L3 are each of positive power and L1, most remote from the CRT, is a weak lens. At least one of the element surfaces is aspheric. The powers of the elements are chosen so that $$-0.20K < K_1 < +0.15K$$

$$+0.62K < K_2 < +0.80K \text{ and}$$

$$+0.55K < K_3 < +0.67K$$

where $K_1$ is the power of the first weak element remote from the object surface, $K_2$ is the power of the second element, $K_3$ is the power of the third element adjacent to the CRT surface and K is the total power of the projection lens. Projection angles up to ±40 degrees are obtained.

5 Claims, 5 Drawing Figures

PROJECTION LENS SYSTEM

BACKGROUND OF THE INVENTION

This invention relates to projection lense, and more particularly, relates to lenses designed to project an enlargement of an image on a cathode ray tube (CRT) such as a phosphor screen of a television set. Such lenses are described in published European Application Nos. 0,135,215 and 0,135,216.

In projection television sets the image may be projected on to a translucent screen from the opposite side to the observer, the CRT and lens being behind the translucent screen and within a free standing cabinet, the front of which comprises the translucent screen. It is desirable to reduce the depth of the cabinet as much as possible and at least below a value such that the cabinet can easily pass through ordinary living room doors. Folding mirrors are usually used within the cabinet to reduce the depth. If the projection distance, that is the distance between lens and translucent screen, is reduced, then the number of internal mirrors can be reduced, but this means that the lens must project at larger field angles. Wide angle projection lenses, covering ±35 degrees or greater, are usually more complex than those for standard projection angles of about ±23 degrees.

In colour projection television systems using three cathode ray tubes each with its own lens, it is often not necessary to correct the chromatic aberration of each lens due to the limited spectral bandwidth of each CRT, thus simplifying the lens design to some extent. The use of aspheric surfaces on some lens elements can also reduce the number of elements in the lens. Such designs are disclosed in U.S. Pat. Nos. 4,300,817 and 4,348,081. However, the types of lenses shown in these specifications are not suitable for very wide angle projection systems as the optical performance at large field angles is very poor, both as regards light transmission, and also resolution. The main cause of this poor performance at large field angles is the steep curvature of the field flattening lens adjacent to the CRT faceplate.

In British Patent Application Nos. 2,091,898A and 2,119,113A, and in European Patent Application Nos. 0,135,215 and 0,135,216, the optical problems caused by the field flattening lens are largely solved by using a CRT having a faceplate which is concave towards the projection lens.

SUMMARY OF THE INVENTION

The aim of the present invention is to improve both the light transmission and also the resolution of wide angle lenses suitable for three tube colour projection television systems, using cathode ray tubes which have faceplates which have a substantial concave curvature on one or both sides. The performance at very large projection angles is superior to the systems described in European Patent Application Nos. 0,135,215 and 0,135,216. For lenses to be used with CRTs having flat or nearly flat face plates, see copending British Patent Application No. 8,431,616, to which U.S. application Ser. No. 807,379 corresponds.

The invention provides a lens system for projecting an enlarged image of a concave object surface onto a planar display screen, characterised in that the projection lens comprises a first element L1 of low power relative to the power of the whole lens, and separated second and third elements L2 and L3, each of positive power, between the first element and the concave object surface. The powers K1, K2 and K3 of the respective elements are chosen relative to the power K of the whole lens so that $$-0.20K < K1 < +0.15K$$

$$+0.62K < K2 < +0.80K$$

$$+0.55K < K3 < +0.67K$$

and at least one of the element surfaces is aspheric. The aperture stop is placed close to the first low power element and is followed in sequence towards the CRT face plate by the second and third elements which, taken together, superficially resemble the lens system of European Patent Application No. 0,135,215. The resulting system has the same number of elements, three, as that described in European Patent Application No. 0,135,216 but with the elements in a different order, the lower power element now being remote from the faceplate rather than between the elements of substantial power. Also, in contrast to the system of European Patent Application No. 0,135,215 wherein the shape of the two elements is generally convex towards the screen, the two elements of substantial power are convex towards the faceplate in the present invention.

A single aspheric surface on any one of the six surfaces available may be sufficient to obtain a resolution sufficient for television projection. Preferably two of the surfaces are aspherized, especially if high definition 1249 line television pictures are to be projected. These two aspherized surfaces may be on adjacent elements, or on the first and third elements or may be on opposite surfaces of one element provided it is sufficiently thick to give effective separation of the aspheric surfaces.

BRIEF DESCRIPTION OF THE DRAWING

Embodiments of the invention will now be described, by way of example, with reference to the accompanying drawings, in which.

DETAILED DESCRIPTION OF THE PREFERRED EMBODIMENTS

Figure 1:
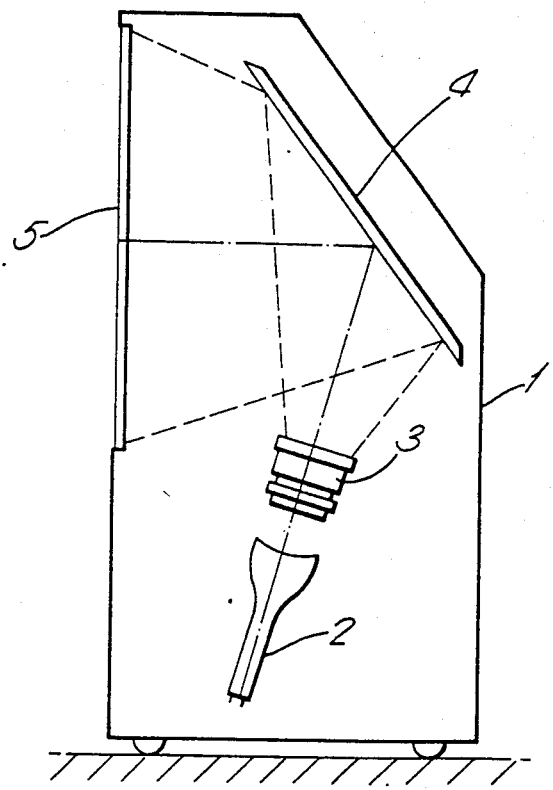
FIG. 1 shows a typical layout of a projection television system to which a wide angle lens system in accordance with the invention may be applied.

Referring to FIG. 1, a free standing cabinet 1 contains a back projection television display system comprising a cathode ray tube (CRT) 2 having a faceplate which is concave towards a projection lens 3, a front metallised mirror 4 to fold the optical path, and a translucent projection screen 5. Screen 5 may be a compound screen comprising a Fresnel lens and a light scattering component. For colour television, three CRTs and three lenses are used in line normal to the plane of the drawing, with the outer CRTs inclined inwards such that the three pictures projected are coincident with each other on the translucent screen 5.

Figure 2:
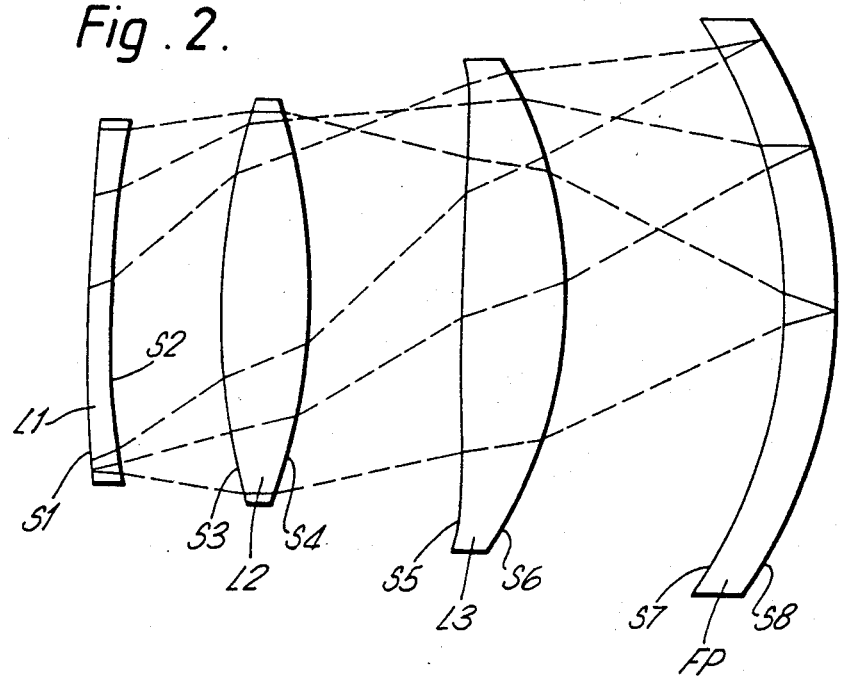
FIG. 2 shows a lens system with three elements of either glass or plastic, and an aperture of F/1.05, which is suitable for projection at angles up to ±40 degrees from a CRT with a concave curved faceplate.
Figure 3:
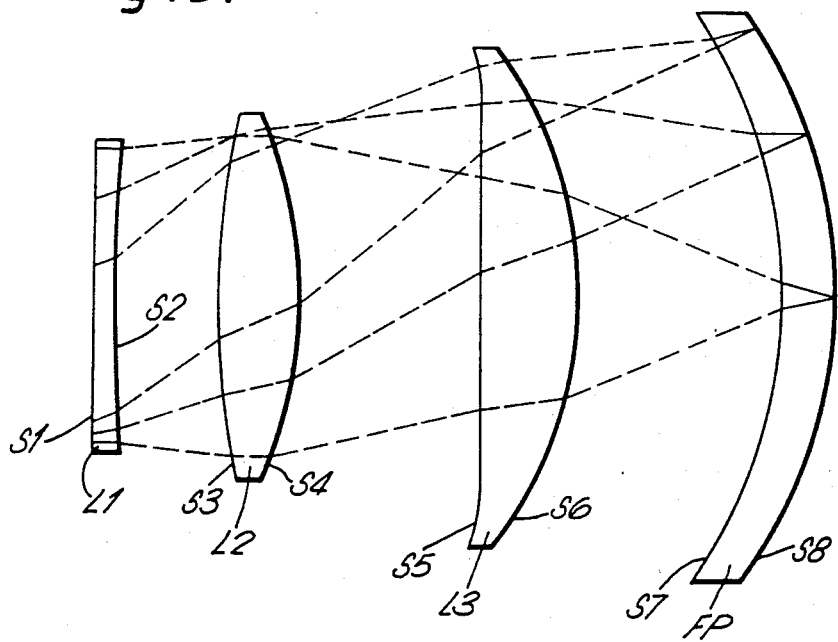
FIG. 3 shows another lens system with three elements of either glass or plastic, and an aperture of F/1.2, which is also suitable for projection at angles up to ±40 degrees from a CRT with a concave curved faceplate.

FIGS. 2 and 3 show two different examples of the projection lens 3, designed with different apertures. These lenses have adequate resolution for both normal 525 or 625 line television and also for high definition 1249 line television right out to the extreme corners of the picture. The lens shown in FIG. 3 additionally has a flat surface on the first element thus further reducing the complexity and cost of manufacture. In these figures the lens elements are designated by the letter L followed by a numeral indicating the sequential position of the element from the image or translucent screen end, to the CRT faceplate end. The CRT faceplate is designated by FP. The surfaces of the elements are designated by the letter S followed by a numeral in the same sequence as the elements. Surfaces which are convex towards the translucent screen are identified by a position radius of curvature, and surfaces which are concave towards the translucent screen are identified by a negative radius of curvature.

The paraxial powers of lens elements L1,L2,L3 are designated by K1,K2,K3 and the power of the complete lens by K. The relative powers of each of the lens elements are chosen so that $$-0.20K < K1 < +0.15K$$

$$+0.62K < K2 < +0.80K$$

$$+0.55K < K3 < +0.67K$$

at least one of the element surfaces being aspheric.

Any one lens element may have spherical surfaces on both sides, or an aspherical surface on one side, or aspherical surfaces on both sides. In the examples shown lenses L1 and L3 have an aspherical surface on one side while lends L2 has spherical surfaces on both sides. The aspherical surfaces are defined by the following relationship:

$$Z = \frac{Cs^2}{1 + \sqrt{1 - eC^2s^2}} + a_4 s^4 + a_6 s^6 + a_8 s^8 + a_{10} s^{10}$$

where Z is the deviation, in the axial direction, of the surface from a plane normal to the optic axis and tangent to the surface at its pole for a zone of the surface which is at a distance s from the axis, C is the curvature of the surface on the axis, e is a conic constant, and $a_4$, $a_6$, $a_8$ and $a_{10}$ are constants for the surface.

The following Tables I and II give the detailed design of the embodiments of FIGS. 2 and 3 respectively.

TABLE I

Focal length 92.1 mm. Relative aperture F/1.05
Projection angle ±40.0 deg Throw distance 750 mm.
Wavelength 525 nm. Magnification 8×.

| | Polar radius mm | Axial thickness mm | Axial separation mm | Refractive index |
|---|---|---|---|---|
| L1 | S1 512.8 | 5.00 | | 1.5727 |
| | S2 493.1 | | 25.63 | |
| L2 | S3 164.6 | 21.00 | | 1.5727 |
| | S4 −136.9 | | 36.28 | |
| L3 | S5 482.0 | 25.00 | | 1.5727 |

TABLE I-continued

Focal length 92.1 mm. Relative aperture F/1.05
Projection angle ±40.0 deg Throw distance 750 mm.
Wavelength 525 nm. Magnification 8×.

| | | | | |
|---|---|---|---|---|
| | S6 −104.6 | | | |
| | | | 52.28 | |
| | S7 −119.2 | | | |
| FP | | 12.00 | | 1.5200 |
| | S8 −119.2 | | | |

Aspheric surfaces: S2, S5

| | S2 | S5 |
|---|---|---|
| C | .002028 | .002075 |
| e | 0 | 0 |
| $a_4$ | $.3789 \times 10^{-6}$ | $-.4840 \times 10^{-6}$ |
| $a_6$ | $.1225 \times 10^{-9}$ | $.1411 \times 10^{-9}$ |
| $a_8$ | $-.4456 \times 10^{-13}$ | $-.5227 \times 10^{-13}$ |
| $a_{10}$ | $.1298 \times 10^{-16}$ | $.5667 \times 10^{-17}$ |

Element values

| | Focal length, mm | Power, mm$^{-1}$ | Relative power |
|---|---|---|---|
| Lens | 92.1 | 0.0109 | 1 |
| L1 | −24,700 | −0.00004 | −0.004 |
| L2 | 133.9 | 0.0075 | 0.688 |
| L3 | 152.4 | 0.0066 | 0.604 |

TABLE II

Focal length 92.3 mm. Relative aperture F/1.2
Projection angle ±40.0 deg Throw distance 750 mm.
Wavelength 525 nm. Magnification 8×.

| | Polar radius mm | Axial thickness mm | Axial separation mm | Refractive index |
|---|---|---|---|---|
| L1 | S1 plane | 5.00 | | 1.5727 |
| | S2 plane | | 23.80 | |
| L2 | S3 215.6 | 19.00 | | 1.5727 |
| | S4 −108.3 | | 42.97 | |
| L3 | S5 851.3 | 23.00 | | 1.5727 |
| | S6 −97.2 | | 48.97 | |
| | S7 −119.1 | | | |
| FP | | 12.00 | | 1.5200 |
| | S8 −119.1 | | | |

Aspheric surfaces: S2, S5

| | S2 | S5 |
|---|---|---|
| C | 0 | .001175 |
| e | 0 | 0 |
| $a_4$ | $.5435 \times 10^{-6}$ | $-.3609 \times 10^{-6}$ |
| $a_6$ | $.8080 \times 10^{-10}$ | $.2297 \times 10^{-10}$ |
| $a_8$ | $-.3581 \times 10^{-14}$ | $-.6778 \times 10^{-14}$ |
| $a_{10}$ | 0 | 0 |

Element values

| | Focal length, mm | Power, mm$^{-1}$ | Relative power |
|---|---|---|---|
| Lens | 92.3 | 0.0108 | 1 |
| L1 | ∞ | 0 | 0 |
| L2 | 128.6 | 0.0078 | 0.718 |
| L3 | 153.7 | 0.0065 | 0.600 |

Figure 4:
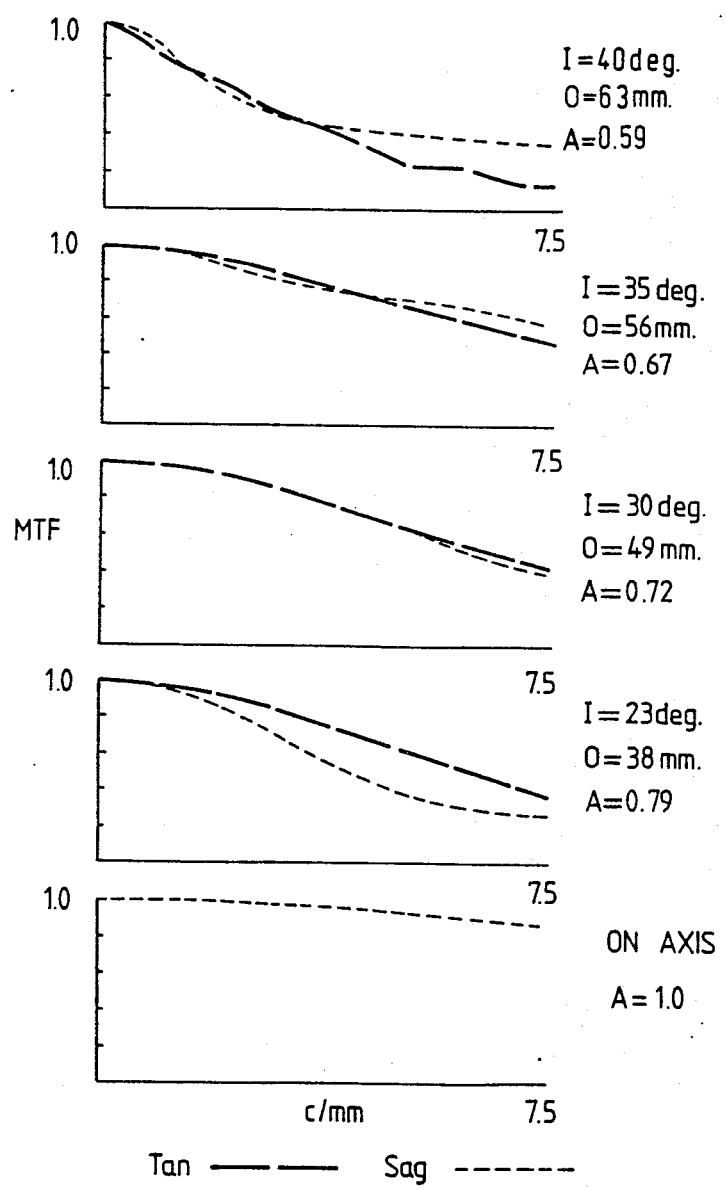
FIGS. 4 and 5 show the modulation transfer functions and relative illumination factors A for the lens system of FIGS. 2 and 3 respectively.
Figure 5:
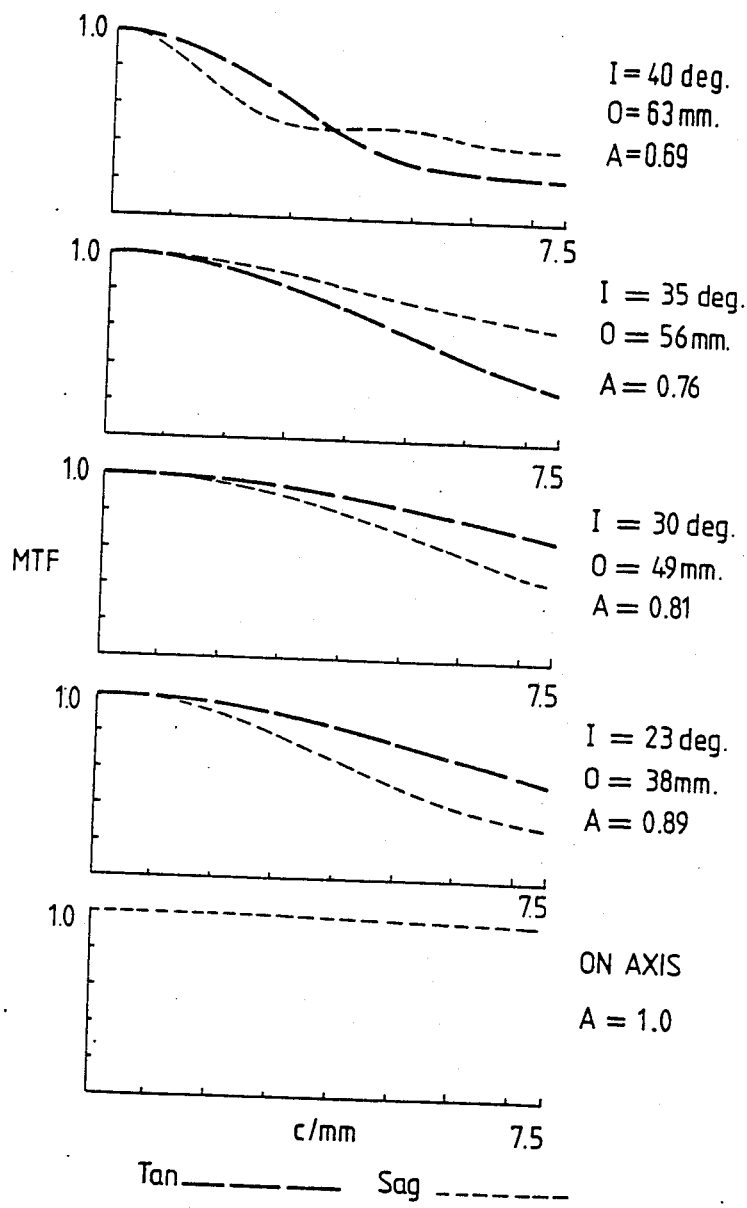

FIGS. 4 and 5 show the performance of the lenses of FIGS. 2 and 3 respectively. The five graphs in each figure show the modulation transfer functions (MTF) plotted vertically as a function of spatial frequency for both the tangential (Tan) and sagittal (Sag) directions. Each graph is for a different position in the projected image, indicated by the object height on the CRT faceplate, and also by the projection angle on the viewing screen side of the lens, measured relative to the optical axis. For each off-axis position the effective geometrical aperture area A is given relative to the value on axis. The MTFs are plotted out to 7.5 cycles per mm as on the CRT faceplate.

In the above designs the CRT faceplate is shown with equal radii on the two sides. The CRT faceplate may however have concentric surfaces or slightly different radii consistent with the faceplate thickness being substantially constant, or chosen so that the faceplate has weak positive or negative power. Either surface of the faceplate may be aspherised to further improve resolution.

I claim:

1. A lens system for projecting an enlarged image of a concave object surface onto a planar display screen, characterised in that the projection lens comprises a first element L1 of low power relative to the power of the whole lens, and separated second and third elements L2 and L3, each of positive power, between the first element and the concave object surface, the powers K1, K2 and K3 of the respective elements being chosen relative to the power K of the whole lens so that $$-0.20K < K1 < +0.15K$$

$$+0.62K < K2 < 30\ 0.80K$$

$$+0.55K < K3 < +0.67K$$

and at least one of the element surfaces being aspheric.

2. A lens system as claimed in claim 1 characterised in that two of the element surfaces are aspheric.

3. A lens system as claimed in claim 1 or claim 2, characterised in that each aspheric surface is defined by the following relationship:

$$Z = \frac{Cs^2}{1 + \sqrt{1 - eC^2s^2}} + a_4 s^4 + a_6 s^6 + a_8 s^8 + a_{10} s^{10}$$

where Z is the deviation, in the axial direction, of the surface from a plane normal to the optic axis and tangent to the surface at its pole for a zone of the surface which is at a distance s from the axis, C is the curvature of the surface on the axis, e is a conic constant, and $a_4$, $a_6$, $a_8$ and $a_{10}$ are constants for the surface.

4. A lens system as claimed in claim 3, characterised in that the lens is combined with a cathode ray tube face plate FP concave towards the lens system for projecting a faceplate raster onto the screen, the lens system being of focal length 92.1 mm at a wavelength of 525 nm, relative aperture F/1.05, projection angle ±40.0°, a throw of 750 mm providing a magnification of 8×, described substantially as follows:

|  | Surface polar radius mm | Axial thickness mm | Axial separation mm | Refractive index |
|---|---|---|---|---|
|  | S1 512.8 |  |  |  |
| L1 |  | 5.00 |  | 1.5727 |
|  | S2 493.1 |  |  |  |
|  |  |  | 25.63 |  |
|  | S3 164.6 |  |  |  |
| L2 |  | 21.00 |  | 1.5727 |
|  | S4 −136.9 |  |  |  |
|  |  |  | 36.28 |  |
|  | S5 482.0 |  |  |  |
| L3 |  | 25.00 |  | 1.5727 |
|  | S6 −104.6 |  |  |  |
|  |  |  | 52.28 |  |
|  | S7 −119.2 |  |  |  |
| FP |  | 12.00 |  | 1.5200 |
|  | S8 −119.2 |  |  |  |

| Aspheric surfaces: S2, S5 | | |
|---|---|---|
|  | S2 | S5 |
| C | .002028 | .002075 |
| e | 0 | 0 |
| $a_4$ | $.3789 \times 10^{-6}$ | $-.4840 \times 10^{-6}$ |
| $a_6$ | $.1225 \times 10^{-9}$ | $.1411 \times 10^{-9}$ |
| $a_8$ | $-.4456 \times 10^{-13}$ | $-.5227 \times 10^{-13}$ |
| $a_{10}$ | $.1298 \times 10^{-16}$ | $.5667 \times 10^{-17}$ |

| Element values | | | |
|---|---|---|---|
|  | Focal length, mm | Power, $mm^{-1}$ | Relative power |
| Lens | 92.1 | 0.01086 | 1 |
| L1 | −24,700 | −0.00004 | −0.004 |
| L2 | 133.9 | 0.0075 | 0.688 |
| L3 | 152.4 | 0.0066 | 0.604 | where L1, L2 and L3 are successive lens elements from the image end and S1 to S8 inclusive are successive element surfaces, positive surfaces being convex towards the image end and negative surfaces being concave towards the image end.

5. A lens system as claimed in claim 3, characterised in that the lens is combined with a cathode ray tube faceplate FP concave towards the lens system for projecting a faceplate raster onto the screen, the lens system being of focal length 92.3 mm at a wavelength of 525 nm, relative aperture F/1.2, projection angle ±40.0°, a throw of 750 mm providing a magnification of 8×, described substantially as follows:

|  | Surface polar radius mm | Axial thickness mm | Axial separation mm | Refractive index |
|---|---|---|---|---|
|  | S1 plane |  |  |  |
| L1 |  | 5.00 |  | 1.5727 |
|  | S2 plane |  |  |  |
|  |  |  | 23.80 |  |
|  | S3 215.6 |  |  |  |
| L2 |  | 19.00 |  | 1.5727 |
|  | S4 −108.3 |  |  |  |
|  |  |  | 42.97 |  |
|  | S5 851.3 |  |  |  |
| L3 |  | 23.00 |  | 1.5727 |
|  | S6 −97.2 |  |  |  |
|  |  |  | 48.97 |  |
|  | S7 −119.1 |  |  |  |
| FP |  | 12.00 |  | 1.5200 |
|  | S8 −119.1 |  |  |  |

| Aspheric surfaces: S2, S5 | | |
|---|---|---|
|  | S2 | S5 |
| C | 0 | .001175 |
| e | 0 | 0 |
| $a_4$ | $.5435 \times 10^{-6}$ | $-.3609 \times 10^{-6}$ |
| $a_6$ | $.8080 \times 10^{-10}$ | $.2297 \times 10^{-10}$ |
| $a_8$ | $-.3581 \times 10^{-14}$ | $-.6778 \times 10^{-14}$ |
| $a_{10}$ | 0 | 0 |

| Element values | | | |
|---|---|---|---|
|  | Focal length, mm | Power, $mm^{-1}$ | Relative power |
| Lens | 92.3 | 0.01083 | 1 |
| L1 | ∞ | 0 | 0 |
| L2 | 128.6 | 0.0078 | 0.718 |
| L3 | 153.7 | 0.0065 | 0.600 | where L1, L2 and L3 are successive lens elements from the image end and S1 to S8 inclusive are successive element surfaces, positive surfaces being convex towards the image end and negative surfaces being concave towards the image end.

* * * * *

UNITED STATES PATENT AND TRADEMARK OFFICE
CERTIFICATE OF CORRECTION

PATENT NO. : 4,699,477
DATED : October 13, 1987
INVENTOR(S) : John A. Clarke

It is certified that error appears in the above-identified patent and that said Letters Patent is hereby corrected as shown below:

Claim 1, line 11    delete "+0.62K<K2<30 0.80K"

insert --+0.62K<K2<+0.80K--

Signed and Sealed this

Twenty-third Day of May, 1989

Attest:

DONALD J. QUIGG

Attesting Officer     Commissioner of Patents and Trademarks